United States Patent [19]
Curley

[15] 3,735,406
[45] May 22, 1973

[54] NAVIGATION AID
[76] Inventor: Morton B. Curley, 457 Melissa Court, Gahanna, Ohio 43230
[22] Filed: July 7, 1970
[21] Appl. No.: 52,937

[52] U.S. Cl..................343/101, 58/74, 58/127 R
[51] Int. Cl...............................................G01s 1/68
[58] Field of Search...............343/101; 58/74, 127 R

[56] References Cited
UNITED STATES PATENTS
1,178,229  4/1916  Graves......................58/127 R
1,135,604  4/1915  Meissner..................343/106 R
2,081,530  5/1937  Dowsett et al............343/101

Primary Examiner—Benjamin A. Borchelt
Assistant Examiner—Richard E. Berger
Attorney—Wood, Herron & Evans

[57] ABSTRACT

A device for systematic and continuous identification of radio beacon transmissions used in navigation by reference to the relationship of a pointer to indicia on the bezel of the apparatus. The indicia on the bezel correspond to the number of sequentially transmitting beacons and the bezel is rotatable to allow synchronization. When a beacon transmission is identified, the bezel is rotated such that the indicia corresponding to the next beacon in the sequence is aligned with the reference position on the device. When the beacon terminates transmission, the device is started, causing the pointer to rotate such that the successive beacons transmission can be identified by observing the position of the pointer relative to the indicia.

7 Claims, 2 Drawing Figures

INVENTOR.
Morton B. Curley
BY
Wood, Herron & Evans
ATTORNEYS

NAVIGATION AID

This invention relates to a method and apparatus to facilitate navigation by reference to radio beacon transmissions and is particularly directed to a timing device which provides instant visual identification of the transmitting station out of a group of sequentially transmitting stations.

A method of radio navigation in boating utilizes a system of U.S. Coast Guard Radio Beacons. These facilities are specifically provided for marine radio navigation and transmitters are located in various sites spaced from each other along the coast of the United States as indicated on the U.S. Coast Guard and Geodetic Survey Charts. Up to six transmitting beacons are situated in one area and share a common frequency. Each beacon transmits for 1 minute and then the next beacon in the sequence transmits for 1 minute until all six beacons have transmitted for 1 minute each, whereupon, the cycle repeats itself. During the minute each beacon is transmitting, the beacons sends an identifying signal of dots and dashes for 50 seconds, and a continuous tone for the remaining ten seconds. It is during the last 10 seconds that the most accurate bearings can be obtained by the navigator. If a beacon grouping contains less than six beacons, the cycle repeats every 6 minutes regardless by allowing certain blank or empty periods of transmission.

In order to obtain the position of a vessel using these signals, a navigator must complete several steps. First, the identity of the radio station then transmitting must be determined by listening to the identifying pattern of dots and dashes being broadcast. Then the navigator usually waits until the continuous tone signal is transmitted during the last 10 seconds of the broadcast interval in order to take a bearing from the transmitted beacon. A bearing is obtained by rotating a directional antenna until the weakest signal or null point is obtained. The attitude of the antenna is compared with a reference which is usually either true North or magnetic North. The navigator has thus determined a line on some bearing from a beacon on which his vessel is located. To determine the exact position of his vessel, a similar bearing line is obtained from another beacon whose location is known by the charts, and the intersection of the two lines on the chart indicates the precise position. To obtain the true course of the vessel a navigator must plot a series of such intersections and this course is then independent of wind, local currents or magnetic variations.

It has been an objective of the present invention to provide a device which enables a navigator to continuously monitor, visually, a sequence of transmissions so that upon the arrival of the continuous tone of the beacon from which a bearing is to be taken, the navigator can be attentive to that specific tone. Thus, the navigator is relieved of the need for more or less continuous aural monitoring of the sequence of transmissions when he could be otherwise occupied with other aspects of boating. Further, the device provides positive visual identification of the transmitting beacon which is useful in those instances where the beacon is weak or difficult to identify because of storm interference with transmission and the like.

More specifically, the device utilizes a watch movement which drives a primary pointer so that it will always point to the station, identified on the bezel of this device, which is then transmitting. Thus the navigator has only to look at the device to tell which station is transmitting and need not identify the code signal. Still more specifically, the invention contemplates the use of a rotatable bezel divided into six sectors and having the six stations identified on respective sectors. The rotatable bezel permits the device to be set with the pointer on the station which is transmitting at the time of setting.

It has been another objective of the invention to provide a secondary pointer which cooperates with a scale on the device to indicate to the observer the point in time that the continuous 10 second tone will occur. Preferably, both pointers are started from the same reference position and are driven at different rates according to the disposition of the indicia on the device.

In an alternative form of the invention, only a single pointer is used in connection with the rotatable bezel. In that embodiment, each station identifying sector of the bezel has indicia identifying the last ten seconds of transmission so as to indicate the arrival of the continuous tone from which a bearing is taken.

While the invention can be used to indicate the occurrence of any repetitive events, as indicated, its preferred use is the indication of repetitive transmissions of radio beacons. The indicia on the bezel correspond to the numbered sequence of radio beacons which are transmitting sequentially in a group of six. Therefore, the preferred embodiment of indicia on the bezel includes six consecutive indicia. Since these indicia are normally disposed around the circumference, the sector alloted each indicia would comprise one-sixth of the circumference. A beacon transmission is 1 minute long, and it thus follows that the sectors of the bezel should correspond in arc-length to the distance traversed by the primary pointer in 1 minute. The primary pointer thus completes one whole revolution is 6 minutes time and since the transmission sequence repeats every 6 minutes, exact correspondence is maintained with no further attention from the operator.

The bezel is rotatably mountable so that the indicia corresponding to any chosen transmitter may be brought into alignment with the reference position from which the pointers are started. This facilitates starting the device at any chosen transmission rather than having to wait until a certain transmission starts.

The secondary pointer is used to provide an indication of precisely when the continuous tone signal will begin and end so that the operator may be alert to the most favorable time period in which to obtain his bearing from the transmitter. Since the 10 second continuous tone is generated only during the last ten seconds of a beacon transmission, and this is common to all Coast Guard beacons, there are indicia suitably disposed on the faceplate of the device which delineate the first 50 seconds of travel of the pointer from the last 10 seconds of travel. This pointer is driven to correspond precisely to the transmission time of any beacon and since all beacons transmit only for 1 minute, this pointer completes one revolution in 60 seconds' time. At the end of 1 minute another beacon begins transmitting and the pointer begins another revolution so that exact correspondence is maintained without further attention of the operator.

The several objectives of the invention will become more readily apparent from the following detailed description in which.

Figure 1:
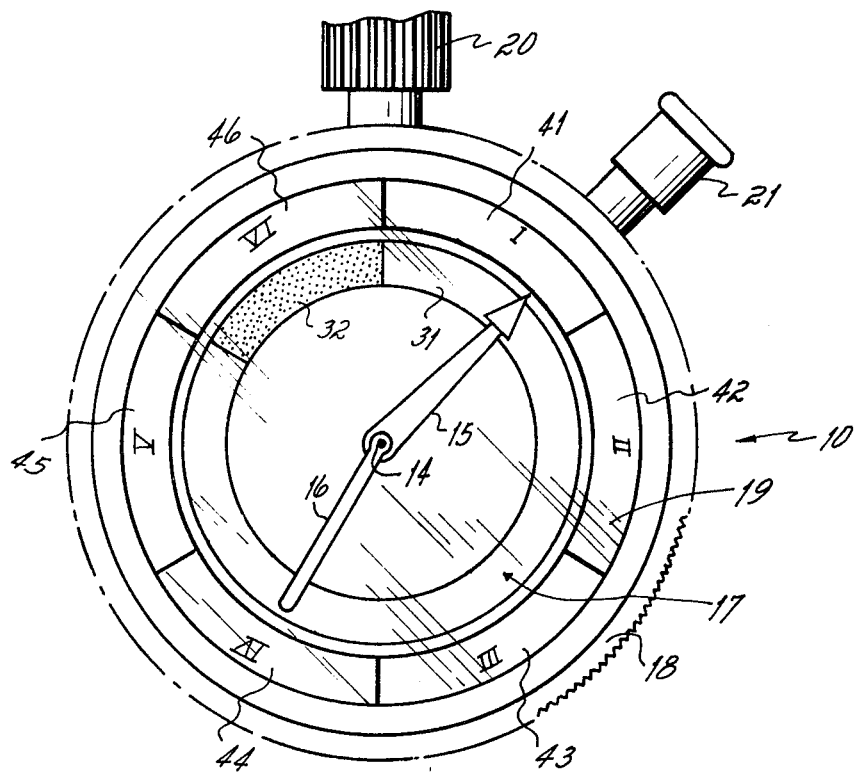
FIG. 1 is a plan view of a navigation aid in accordance with the invention.
Figure 2:
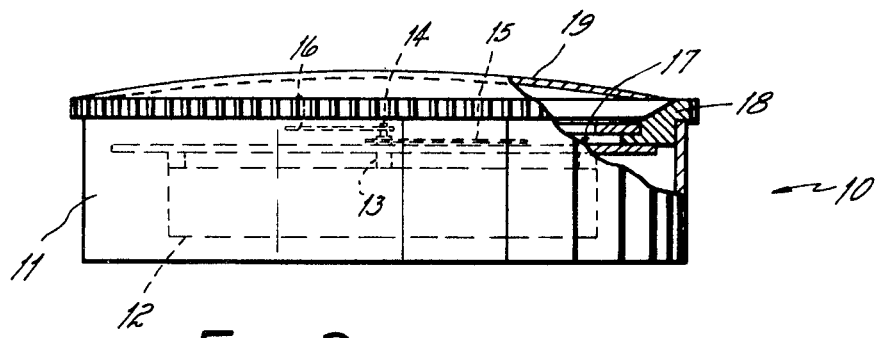
FIG. 2 is a diagrammatic side elevational view partly in section of the navigation aid.

The navigation aid is a device 10 having a casing 11 which encloses a watch movement 12 having two concentric posts 13 and 14, respectively which carry a primary pointer 15 and a secondary pointer 16, respectively. The movement is enclosed by a faceplate 17 which is fixedly mounted to the casing. A rotatable bezel 18 is mounted on the casing and carries a crystal 19.

The movement 12 is adapted to be started, stopped and reset at the will of the operator. To this end, the device includes a rotatable and reciprocable knob 20 and a reset button 21. Rotation of the knob 20 winds the mainspring of the movement 12 and reciprocation of the knob 20 either starts or stops the movement. When the movement is stopped, reciprocation of the reset button 21 returns the hands to their original position.

In the preferred form of the invention, the faceplate is divided into a long sector 31 corresponding to the identifying transmission and a short sector 32 corresponding to the 10 second continuous tone. The rotatable bezel is divided into six sectors 41 to 46 which are identified by numerals I to VI, respectively, corresponding to the beacon sequences I to VI as identified by the Coast Guard.

Again in the preferred form of the invention, the primary pointer 15 which identifies the transmitting station, moves one revolution every 6 minutes. The secondary pointer 16 whose function is to signal the approach of the 10 second continuous signal (identified by sector 32) moves one revolution per minute.

Where the transmission period is 1 minute there is believed to be no advantage in having the secondary pointer 16 move at any speed other than one RPM. The primary pointer 15, however, can advantageously be geared to make one revolution every hour. This would permit the use of a standard watch movement having a sweep second hand and a minute hand used as the pointers 15 and 16, respectively, although the minute hand would be a little more difficult to read than the faster moving pointer 15.

Of the preferred embodiment, it should be understood that the invention is useful in identifying a particular event in a repetitive series of events. For example, if there are seven events in the repetitive series, the watch units would be formed in multiples of seven rather than six, with one revolution of the secondary pointer corresponding to the length of an event, but otherwise, the principles of the invention would remain the same.

In the practical operation of the invention wherein specific radio beacons are identified, the number of repetitive events is six. These repetitive events are identified by the numerals I to VI, each Roman numeral corresponding to a specific station whose transmitter is locatable and identifiable on a navigation chart. For example, in the area around Martha's Vineyard - Nantucket, Massachusetts, the following are the stations, their identification codes and the frequency of transmission.

| Sequence | 302 KC | 324 KC |
| --- | --- | --- |
| I | Cape Cod<br>—.— | |
| II | Nantucket<br>— | Butler Flats<br>—.. |
| III | Point Judith<br>—.. | Nobska Point<br>—. |
| IV | Pollock Rip L.S.<br>—..— | Cleveland Ledge<br>—.—. |
| V | Buzzards Bay<br>.—.. | Cape Cod Breakwater<br>..— |
| VI | Boston L.S.<br>—.. | |

The navigator sets his receiver at 302 kilocycles and listens to the code. Assume the first code he hears is (–..) identifying Point Judith which is designated as III. The navigator rotates the bezel until the line separating sectors III and IV is at the start position. At the end of the transmission of sequence III, the last 10 seconds of which is a continuous tone, the start button is operated. During the next minute, the sequence identifying pointer 15 will move adjacent the sector marked IV so that at a glance, the navigator can identify that beacon without having to identify it aurally. Since the sequence will repeat itself, that is at the end of the transmission of station VI, the station I will transmit, at any time during the voyage, the particular beacon can be identified merely by glancing at the navigation aid.

Since the rotation of the directional antenna will normally be done only during the transmission of the continuous tone, the navigator can attend to other matters without listening particularly attentively to the beacon. By glancing at the navigation aid, he can watch the movement of the sweep hand 16 and become attentive to the signal only as the hand 16 approaches the final 10 second sector identified as sector 32 on the drawings.

I claim:

1. A navigation aid comprising:

a casing, a watch movement mounted in said casing, said movement including a pointer which rotates one complete revolution in a multiple of 6 minutes, said movement having a reference position to which the pointer can be reset, a bezel rotatably mounted on said casing and having indicia dividing said bezel into a multiple of six consecutively marked sectors, each sector corresponding in arc-length to the rotational travel of said pointer for one minute, and a means for starting, stopping and resetting said movement, whereby said movement can be started from said reference position at the beginning or end of a selected radio beacon transmission and said bezel rotated to said reference position causing the sector marked on said bezel in accordance with the identity of said transmission to be aligned with said reference position.

2. A navigation aid according to claim 1 further comprising, an additional pointer rotated by said movement at the rate of one rotation per minute.

3. A navigation aid according to claim 2 further comprising,
a faceplate non-rotatably mounted in said casing,
said faceplate having indicia delineating at least the final 10 seconds in the sweep of said additional pointer.

4. A navigation aid according to claim 1 in which said bezel is divided into only six sectors which are consecutively numbered I through VI.

5. A navigation aid according to claim 1 in which said pointer makes one revolution in 6 minutes.

6. The method of identifying a particular radio beacon transmission out of a plurality of sequential beacon transmissions, each sequential transmission being of 1 minute's duration, using a watch movement which can be started, stopped, and reset at will, said movement having a primary pointer which rotates one revolution in a multiple of 6 minutes, said movement having a reference position to which said pointer can be reset and having a rotatable bezel with a multiple of six consecutively marked sectors each corresponding in arc-length to the rotational travel of said pointer in one minute, comprising the steps of,
identifying one of said beacon transmissions,
rotating said bezel to a position causing a sector, having a mark corresponding to the next beacon in said transmission sequence, to be aligned with the reference position,
starting said movement at the beginning of the next transmission in the sequence,
identifying further radio beacon transmissions by reference to the position of said pointer relative to said marked sectors on said bezel.

7. The method according to claim 6 wherein said movement includes a secondary pointer which rotates at 1 revolution per minute around a faceplate having indicia delineating the last 10 seconds prior to said reference position,
the further step of observing said secondary pointer to determine visually the last ten seconds of transmission from any beacon.

* * * * *